United States Patent [19]
Beijaard et al.

[11] Patent Number: 5,878,785
[45] Date of Patent: Mar. 9, 1999

[54] MACHINE FRAME FOR THE MEAT PROCESSING INDUSTRY AND TUBE PROFILE

[75] Inventors: Barend Jacobus Beijaard, Oploo; Thomas Gerardus Jacobs, Doetinchem; Leonardus Jozephus Antonius Tiggeloven, Groenlo, all of Netherlands

[73] Assignee: Stork R.M.S. B.V., Lichtenvoorde, Netherlands

[21] Appl. No.: 721,821

[22] Filed: Sep. 27, 1996

[30] Foreign Application Priority Data

Sep. 29, 1995 [NL] Netherlands ............................ 1001322

[51] Int. Cl.⁶ ................................. F16L 9/18; E04C 3/30
[52] U.S. Cl. .......................... 138/115; 138/111; 138/114; 52/730.4; 52/731.2
[58] Field of Search ........................... 138/110, 115–117, 138/177; 104/89, 93, 106, 107, 109, 110; 52/730.4, 731.2

[56] References Cited

U.S. PATENT DOCUMENTS

| | | | |
|---|---|---|---|
| 3,593,666 | 7/1971 | Savage | 104/89 |
| 4,524,698 | 6/1985 | Tourtellier et al. | 104/110 X |
| 4,843,971 | 7/1989 | Braunagel | 104/94 |
| 4,860,662 | 8/1989 | Matsumoto et al. | 104/93 |
| 5,450,703 | 9/1995 | Fuhrman et al. | 138/115 X |
| 5,553,947 | 9/1996 | Scheib et al. | 104/107 X |

FOREIGN PATENT DOCUMENTS

| | | | |
|---|---|---|---|
| 3201402 | 7/1983 | Germany | B65G 9/00 |
| 9310593 | 10/1993 | Germany | B66C 7/02 |

*Primary Examiner*—Patrick F. Brinson
*Attorney, Agent, or Firm*—Webb Ziesenheim Bruening Logsdon Orkin & Hanson, P.C.

[57] ABSTRACT

The invention relates to a machine frame for the meat processing industry, which can be assembled at least partly from tube profile parts, which tube profile parts can be loaded and the outside of which comprises at least one guide surface for guiding machine parts.

The invention also relates to a tube profile for assembling such a machine frame. Using the machine frame and the tube profile according to the invention it is possible to assemble constructions which can be cleaned very easily.

7 Claims, 3 Drawing Sheets

MACHINE FRAME FOR THE MEAT PROCESSING INDUSTRY AND TUBE PROFILE

BACKGROUND OF THE INVENTION

The invention relates to a machine frame for the meat processing industry. The invention also relates to a tube profile for assembling at least a part of a machine frame for the meat processing industry.

PRIOR ART

In the meat processing industry transport and processing of the basic products, semi-manufactures and end products are usually at least partly mechanized or automated. For instance, in a slaughterhouse the transport of cadavers thus takes place along a guide track provided with hooks, along which guide track processing stations can optionally be arranged. Both conveyor and processing station generally comprise a frame to support the elements providing the required functionality. In the meat processing industry good hygiene is moreover of very great importance. A drawback of the devices currently used in the production environment is that they are difficult to clean and that they are moreover constructions which are very difficult to modify when there are changed requirements in respect of production or transport.

From the German Offenlegungsschrift DE 3201402 is thus known a tubular track device for manufacture using system building and in which at least one elongate u-shaped aluminium profile part for mounting horizontally on a ceiling carries a guide tube. The legs of the u-shaped profile part are short. The upper profile part is suspended from the ceiling with interposing of mounting elements, wherein the mounting elements take a temperature insulating form. The lower profile part carries on the inside of the guide tube along which hanging aluminium guide hooks are slidable.

The object of the present invention is to provide a machine frame for the meat processing industry and a tube profile for assembling such a machine frame which can be cleaned well, provides sufficient sturdiness, is easy to construct and can be applied in simple manner.

SUMMARY OF THE INVENTION

The invention provides for this purpose a machine frame for the meat processing industry, which can be assembled at least partly from tube profile parts, which tube profile parts can be loaded and the outside of which comprises at least one guide surface for guiding machine parts. In such a machine frame the load-bearing function and the guiding function are combined in one profile part. This limits the number of components required in a machine frame and is thereby relatively easier to clean than an existing machine frame. These advantages are realized particularly well when the tube frame part is self-supporting.

The tube frame parts are preferably embodied such that they comprise at least one internal channel for receiving conduits and/or cables. By arranging conduits and/or cables in the tube profile the number of external parts is further reduced. The channel can also function directly to transport a medium so that the channel wall can also function as conduit wall. This step also results in the machine frame being easier to clean. Another advantage is that the conduits and/or cables are protected, so reducing the risk of damage.

In yet another preferred embodiment a sensor is arranged in the frame for recording positions of an object located on the outside of the tube profile parts, such as for instance a part of a carcass, a trolley, a person etc. It will be apparent that with such a sensor the absence of an object on the outside of the tube profile part can likewise be detected (0-measurement). Due to the inclusion of the sensor in the profile part this element does not impede cleaning of the device either. Particularly in the case of sensors, which are usually sensitive, the aspect of protection against external influences is also of great importance.

In another preferred embodiment the tube profile part is provided with an internally arranged storage container for gas or liquid, an actuator and/or nozzle for passage of a medium. By arranging one or more of these elements in the profile part the outside of the machine frame will be simplified further. This results in the advantages already stated a number of times above.

The invention also provides a tube profile for assembling at least a part of a machine frame for the meat processing industry, wherein the tube profile has a cross section, the periphery of which is substantially defined by substantially straight sides, which sides enclose internal angles which are smaller than 290°. Understood by internal angle is the angle between two adjacent, substantially flat sides of the tube profile, as seen from the inside of the tube profile. Limiting the internal angle can prevent corners and/or grooves in which dirt can accumulate being situated on the outside of the tube profile. This advantage is already realized with an internal angle smaller than 290° but will become even more clearly apparent when this angle is smaller, for instance 230°. It is however recommended even more to further reduce this angle so that it is around 180° or even less than 180°. It thus becomes very improbable with an angle of less than 180° that dirt will accumulate on the outside of the profile part close to this angle. The substantially straight sides are also very suitable for guiding for instance a carriage or trolley.

The tube profile preferably has a cross-section, the periphery of which is substantially defined by at least six substantially straight sides. These substantially straight sides provide the possibility of providing a supporting force in different directions. Depending on the position of the object for supporting and the direction of the force to be produced, such an object can engage on one or more sides on the tube profile. This can take place for instance with interposing of protrusions, rollers, wheels, guide plates etc. Another advantage of the substantially straight sides is that they are easy to clean.

At least one channel is preferably arranged in the tube profile for the passage of conduits and/or cables. In another preferred embodiment at least one channel is arranged in the tube profile for the passage of a medium. The arrangement of conduits, cables, and/or channels in the tube profile limits the necessity of external conduits, cables, pipes, tubes, hoses etc. Limitation of these external elements makes the device in which the tube profile is incorporated easier to clean. The risk of damage to these elements is also limited. This step can also prevent products or people becoming entangled in loose-hanging cables, conduits etc.

In an example of the tube profile according to the invention, as shown in the accompanying FIG. 1, made of 6063 T5 (AlMgSiO5) and with as largest external dimensions 200 mm×80 mm, the moment of inertia in horizontal direction is $3.9 \times 10^6$ mm$^4$ and in vertical direction $15.1 \times 10^6$ mm$^4$. A steam pipe as shown in German Offenlegungsschrift DE-3201402 in a 1.5-inch version has a moment of inertia of $0.14 \times 10^6$ mm$^4$ and in a 2-inch version of $0.31 \times 10^6$ mm$^4$. The object of relative sturdiness in the tube profile has been realised according to the present invention.

The tube profile is in preference manufactured at least partly from extruded aluminium. Aluminium is a material which can be extruded very well, whereby relatively complex shapes can be manufactured.

The tube profile is preferably provided with an internal screw thread on at least one end face. Such an internal screw thread enables fixing of the profile to another profile, to a corner piece or enables a cover plate to be screwed to the end face of the profile.

BRIEF DESCRIPTION OF THE DRAWINGS

The present invention will be further elucidated with reference to the non-limitative embodiments shown in the following figures. Herein.

DESCRIPTION OF THE PREFERRED EMBODIMENTS

Figure 1:
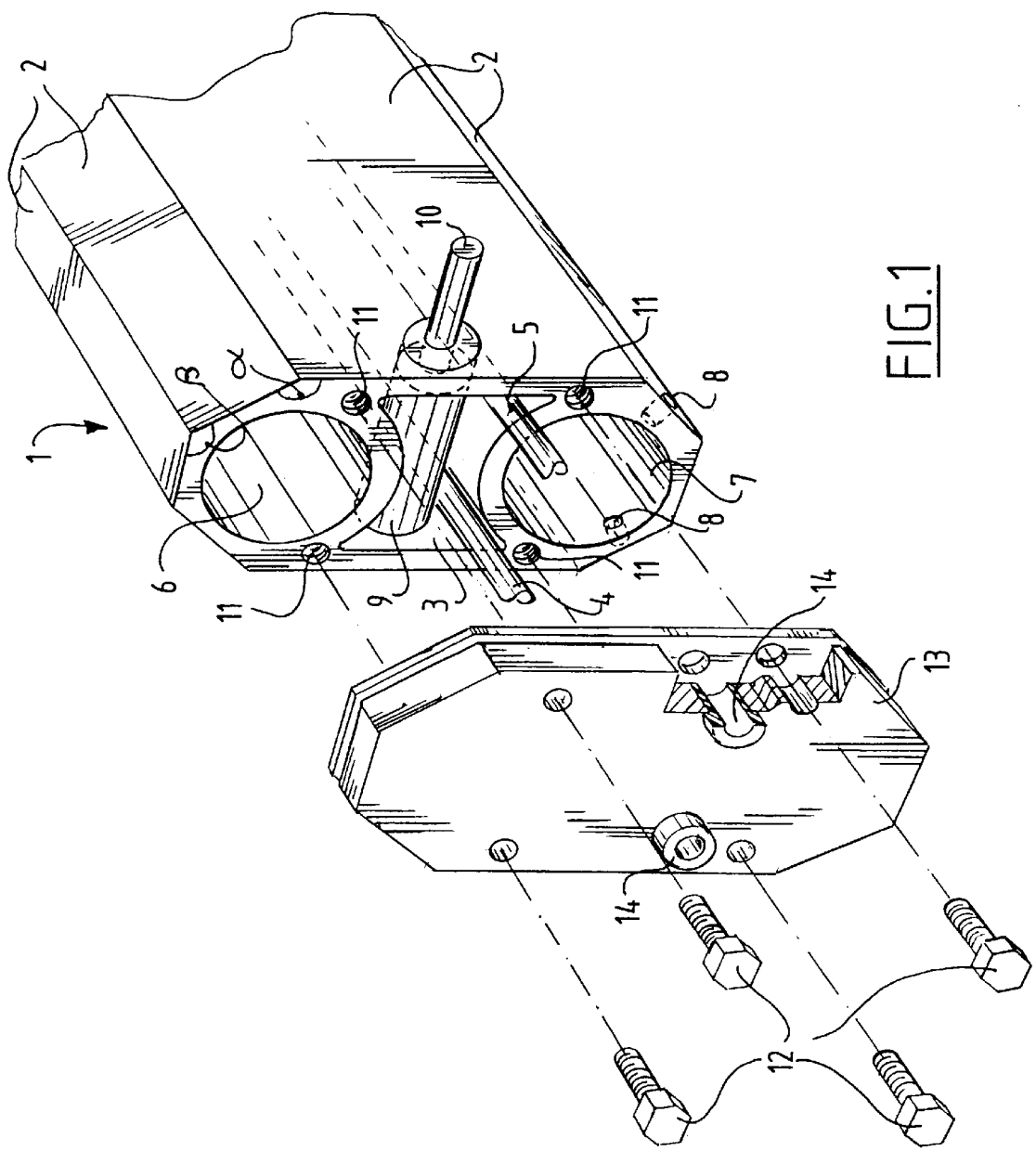
FIG. 1 shows a perspective view of a tube profile with cover plate according to the invention.

FIG. 1 shows a tube profile 1 which has a cross-section of which the periphery is substantially defined by eight substantially straight sides 2. These straight sides 2 enclose internal angles alpha, beta which are smaller than 180°. The outer surface of tube profile 1 has a shape such that it is very simple to clean and contains no grooves or other recesses in which dirt can accumulate. A channel 3 is arranged in the tube profile for passage of a conduit 4 and a cable 5. It will be apparent that sufficient space is available in the channel 3 for passage of other possible conduits or cables. The tube profile 1 further comprises two internal channels 6,7 for passage of a medium. Passage of for instance coolant or air can herein be envisaged if the tube profile 1 is situated in a warm environment. It is also possible to use one or both channels 6,7 for transport of liquid or gas to a desired position. In this figure spray nozzles 8 are thus shown with which for instance a liquid can be sprayed and/or atomized. The wall parts of the internal channels 6,7 (and also the internal wall parts of channel 3) located on the inside of tube profile 1 provide profile 1 with a greater robustness.

Further arranged in tube profile 1 is an actuator 9 for actuating a rod 10 which is accessible on the outside of tube profile 1. The actuator 9 can consist of a cylinder for causing reciprocating movement of rod 10 as well as an electric motor for causing rotation of the rod 10 depending on the required function of rod 10. On the end face of tube profile 1 are situated openings 11 with internal screw thread. By means of bolts 12 it is possible to fasten a cover plate 13 to the end face of profile 1. The bolts 12 therein co-act with the openings 11. Bushes 14 are arranged in cover plate 13 for passage of conduit 4 and cable 5.

Figure 2:
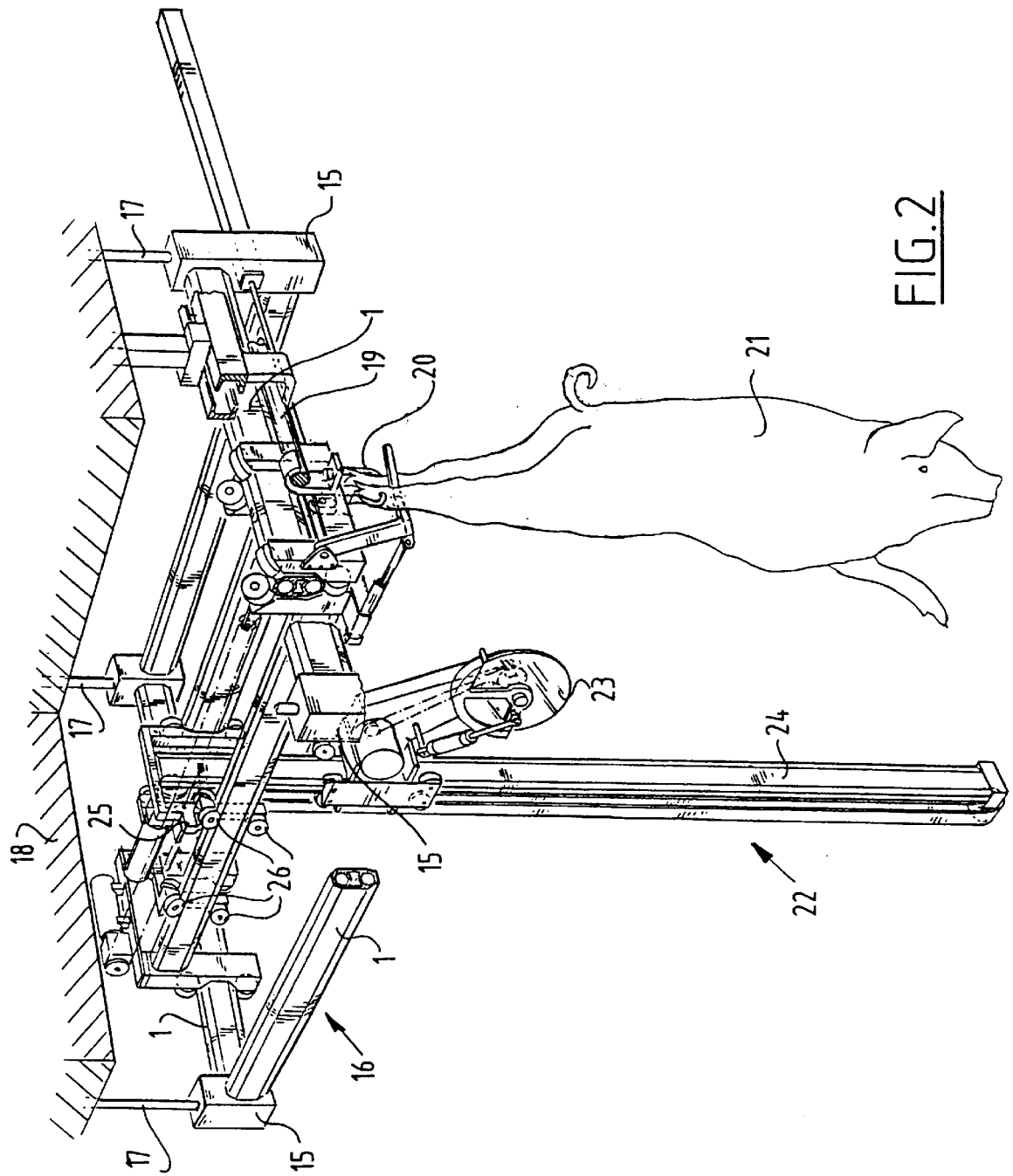
FIG. 2 shows a perspective view of a machine frame for the meat processing industry according to the invention.

FIG. 2 shows a machine frame for the meat processing industry which is partly assembled from tube profile parts 1 the same as tube profile 1 shown in FIG. 1. In co-action with connecting pieces 15 the tube profile parts 1 herein form a frame 16 which is suspended from a ceiling 18 with interposing of rods 17. By means of an already existing transport system 19 cadavers 21 suspended from hooks 20 are carried along a machine 22 of which the frame 16 forms part. It can be seen clearly in this figure that tube profiles 1 are utilized to support machine parts such as for instance a rotatable knife 23. In addition to the supporting function of the machine parts, it is likewise visible that tube profiles 1 are used for guiding machine parts. It can thus be seen for instance that a vertical profile part 24 carrying the rotatable knife 23 is fixed to a carriage 25 which is guidably supported on a horizontal profile part 27 with interposing of rollers 26.

Figure 3:
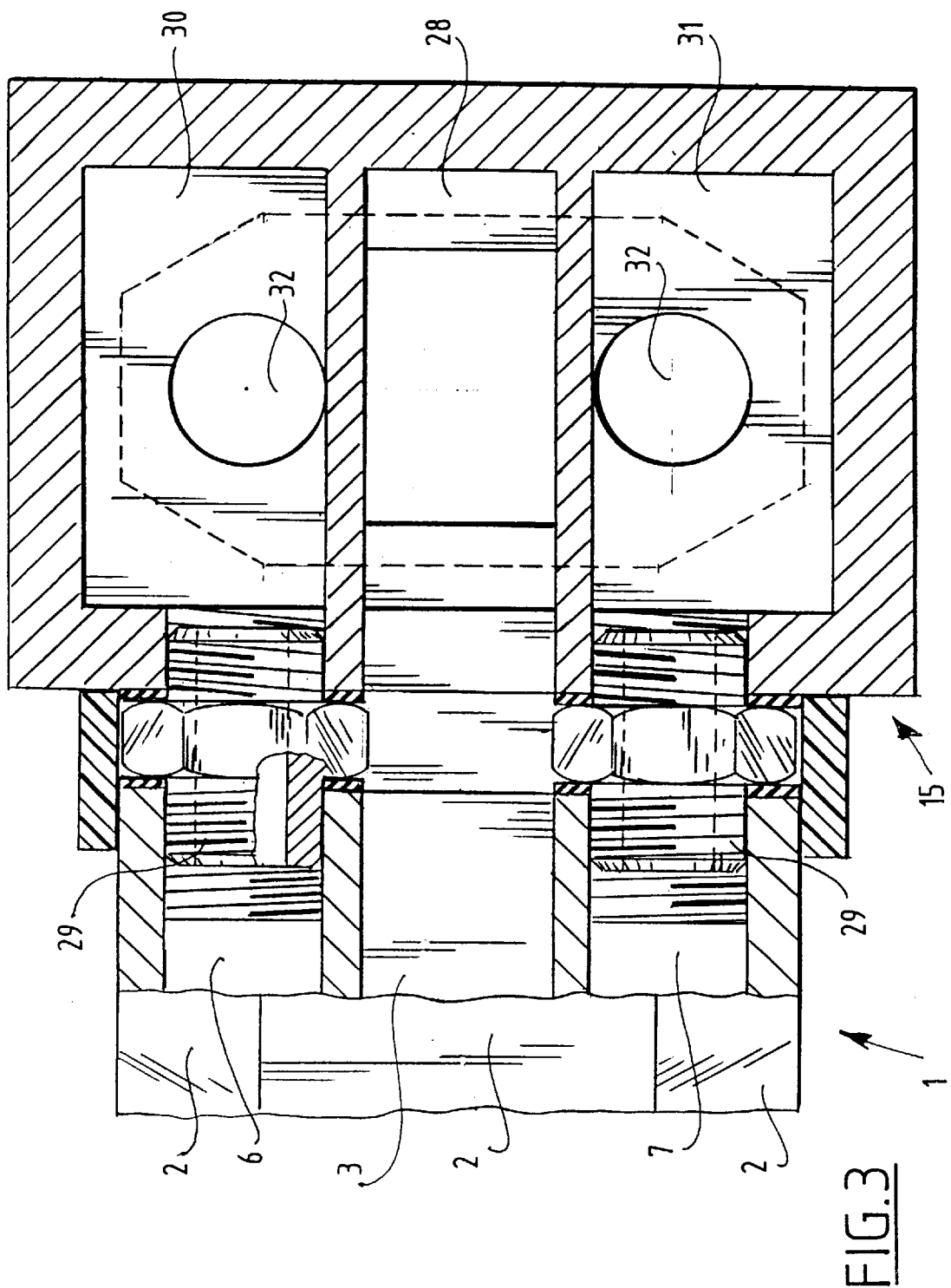
FIG. 3 shows a cross-section through a profile part according to the invention with a coupling piece fixed thereto.

Finally, FIG. 3 shows a connecting piece 15 for fixing to a tube profile 1 as shown in the foregoing figures. Hollow coupling elements 29 are placed in the channels 6,7 for transport of a medium, which coupling elements 29 are provided with two-sided screw thread. If a channel 6,7 is not used for medium transport the coupling element 29 can be embodied without internal opening. The coupling elements 29 connect unto the connecting piece 15 in which separate channels 30,31 respectively connect unto the channels 6,7 for the transport of a medium. In this manner a medium-tight coupling can be effected between respectively channels 6 and 30 and channels 7 and 31. Arranged in an end face of connecting piece 15 are openings 32 which are connectable to a profile other than profile 1 in the same manner as shown here. A channel 28 forming part of connecting piece 15 also connects onto the channel 3 for passage of conduits or cables (not shown). The connection between channels 3 and 28 does not however have to be medium-tight or can at least meet less stringent requirements than the above described couplings of channels. In FIG. 2 the connecting piece 15 shown here is connected to the ceiling in a number of cases by means of a rod 17. This is not essential, however.

We claim:

1. A machine frame for the meat processing industry, comprising:

tube profile parts, which tube profile parts are configured to support a load and the outside of which comprises at least one guide surface for guiding machine parts such that the guided machine parts only contact the outside of the tube profile parts, wherein the tube profile parts have substantially straight sides, and wherein adjacent sides enclose an internal angle less than 290°.

2. The machine frame as claimed in claim 1, wherein at least one tube profile part is supported only at discrete positions along its length.

3. The machine frame as claimed in claim 1, wherein the tube profile parts are embodied such that they comprise at least one internal channel for receiving conduits or cables.

4. The machine frame as claimed in claim 1, wherein a sensor is arranged in the frame for recording positions of an object located on the outside of the tube profile parts.

5. The machine frame as claimed in claim 1, wherein at least one tube profile part is provided with a storage container for a medium.

6. A machine frame for the meat processing industry, comprising:

tube profile parts, which tube profile parts are configured to support a load and the outside of which comprises at least one guide surface for guiding machine parts, wherein an actuator is arranged in at least one of the tube profile parts and an element actuated by the actuator is accessible from the outside of the tube profile part.

7. A machine frame for the meat processing industry, comprising:

tube profile parts, which tube profile parts are configured to support a load and the outside of which comprises at least one guide surface for guiding machine parts, wherein a nozzle for passage of a medium is arranged in a wall of a tube profile part.

* * * * *